(12) United States Patent
Penza

(10) Patent No.: US 6,712,556 B2
(45) Date of Patent: Mar. 30, 2004

(54) METHOD AND APPARATUS FOR ROUTING CABLE IN EXISTING PIPELINES

(76) Inventor: G. Gregory Penza, 92 Central Pkwy., Huntington, NY (US) 11743

( * ) Notice: Subject to any disclaimer, the term of this patent is extended or adjusted under 35 U.S.C. 154(b) by 85 days.

(21) Appl. No.: 09/910,244

(22) Filed: Jul. 20, 2001

(65) Prior Publication Data

US 2002/0170612 A1 Nov. 21, 2002

Related U.S. Application Data

(60) Provisional application No. 60/292,248, filed on May 18, 2001.

(51) Int. Cl.$^7$ .................................................. F16L 7/00
(52) U.S. Cl. .......................... 405/183.5; 254/134.3 R; 405/184.4
(58) Field of Search .......................... 405/183.5, 184.1, 405/184.2, 184.4; 254/134.3 R

(56) References Cited

U.S. PATENT DOCUMENTS

| | | | |
|---|---|---|---|
| 4,647,251 A | * 3/1987 | Gale | 405/183.5 |
| 5,040,922 A | 8/1991 | Himmler | |
| 5,119,862 A | 6/1992 | Maimets et al. | |
| 5,351,720 A | 10/1994 | Maimets | |
| 5,725,026 A | 3/1998 | Maimets | |
| 5,971,030 A | 10/1999 | Maimets | |
| 6,134,766 A | * 10/2000 | Sievert | 405/183.5 |
| 6,138,718 A | 10/2000 | Maimets | |
| 6,311,730 B2 | * 11/2001 | Penza | 138/98 |
| 6,439,809 B1 | * 8/2002 | Hecht et al. | 405/183.5 |
| 6,572,306 B2 | * 6/2003 | Prusak | 405/183.5 |

FOREIGN PATENT DOCUMENTS

| | | |
|---|---|---|
| EP | 0 936 478 A1 | 8/1999 |
| EP | 0 978 674 A1 | 2/2000 |
| EP | 1 008 881 A1 | 6/2000 |
| EP | 1 011 180 A1 | 6/2000 |
| EP | 1 011 181 A1 | 6/2000 |

OTHER PUBLICATIONS

Patent Abstract of EPO, Corresponds to EP 1 011 181.
Patent Abstract of EPO, Corresponds to EP 1 008 881.
Patent Abstract of EPO, Corresponds to EP 1 011 180.
Patent Abstract of EPO, Corresponds to EP 0 978 674.
Patent Abstract of EPO, Corresponds to EP 0 936 478.
Article in New York Times, dated Thursday, Mar. 8, 2001, pp. 1 and 7; entitled: Wiring the City: Humans Won't Do, by author John Schwartz.

* cited by examiner

*Primary Examiner*—Frederick L. Lagman
(74) *Attorney, Agent, or Firm*—Brooks Kushman P.C.

(57) ABSTRACT

Carriers and support means for routing cable structures in existing pipelines are disclosed, the carriers comprising coiled or folded cylinders or sections thereof bearing or adapted to bear a cable support means are disclosed, as well as a method of fixing such carriers to the interior of pipelines, and routing cable structures by means of such devices and methods.

10 Claims, 7 Drawing Sheets

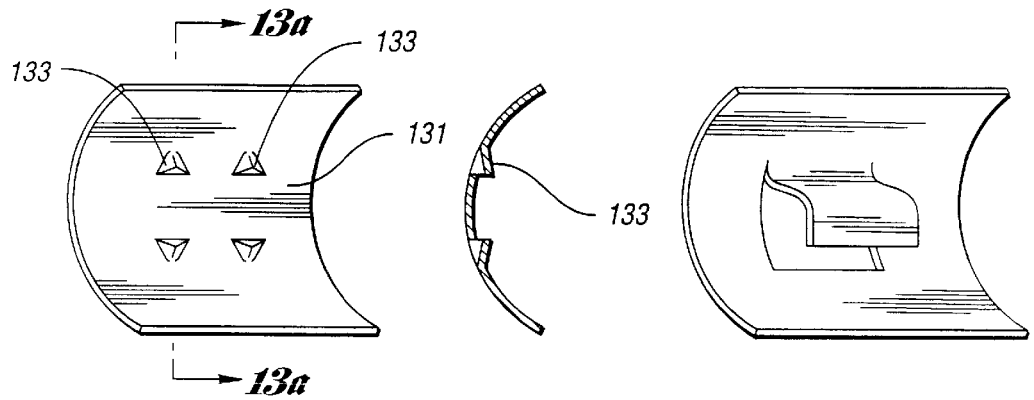
*Fig. 13*   *Fig. 13a*   *Fig. 13b*
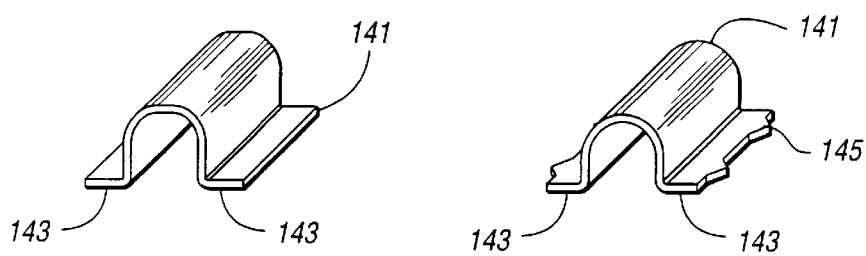
*Fig. 14a*   *Fig. 14b*
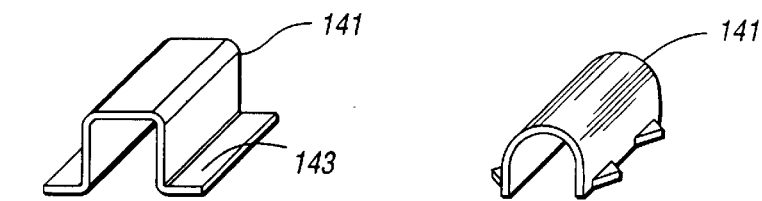
*Fig. 14c*   *Fig. 14d*
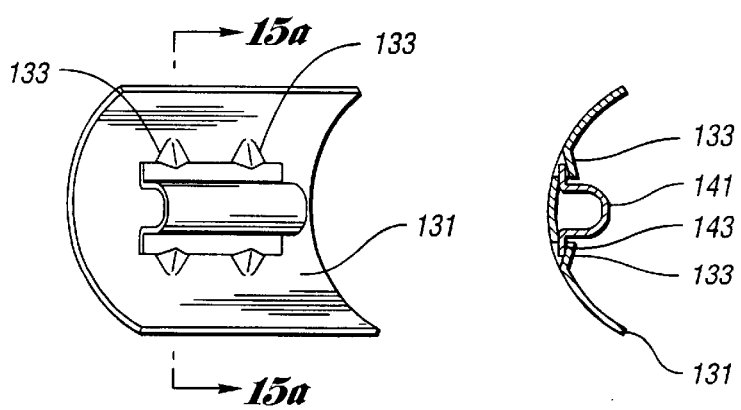
*Fig. 15*   *Fig. 15a*

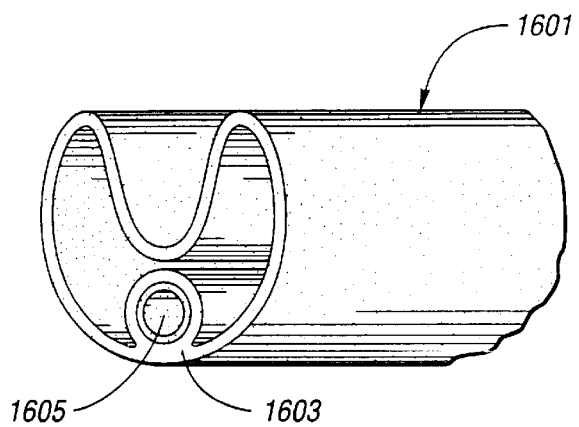
Fig. 16
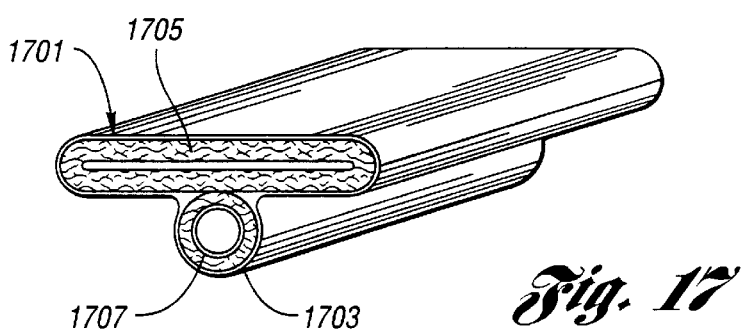
Fig. 17
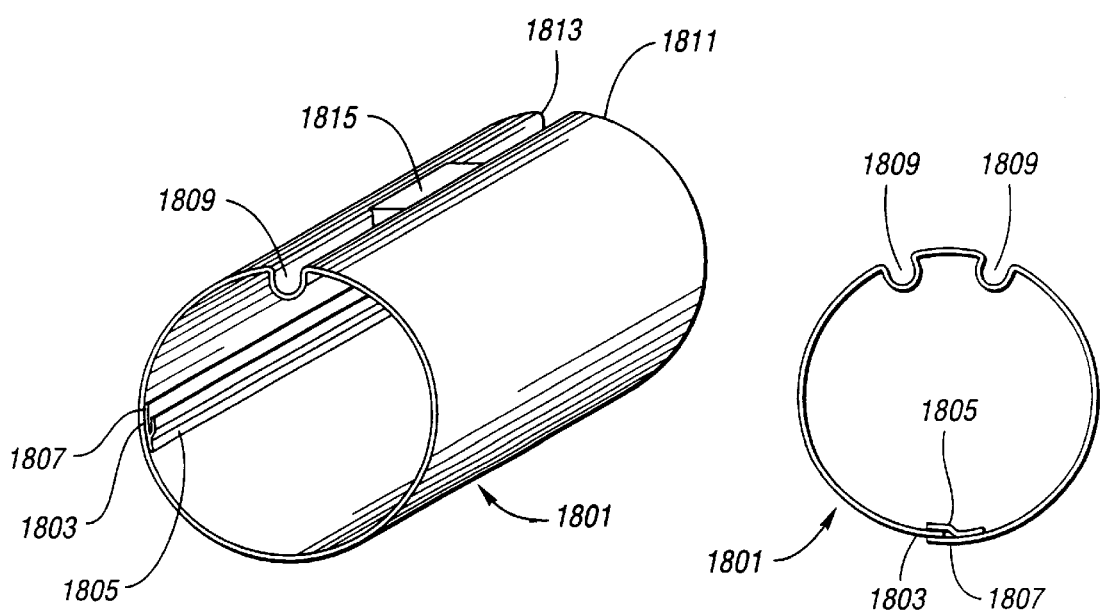
Fig. 18
Fig. 18a

METHOD AND APPARATUS FOR ROUTING CABLE IN EXISTING PIPELINES

CROSS-REFERENCE TO RELATED APPLICATION

This application claims the benefit of U.S. provisional application Ser. No. 60/292,248, filed May 18, 2001.

BACKGROUND OF THE INVENTION

1. Field of the Invention

The present invention pertains to routing cable within existing pipelines, and to apparatus suitable for use therein.

2. Background Art

In rural environments, routing of a variety of cable, particularly communications cable, may be accomplished by overhead routing on "telephone" poles or by routing underground in newly installed conduits or tunnels. In suburban environments, both overhead and underground routing is also commonplace, the latter particularly in the case of new construction.

In urban environments, however, cable routing is a difficult feat. Often, overhead routing lines are either non-existent, or are already used to full capacity. Underground routing is exceptionally expensive, when available at all, since adding additional tunnels or conduit often involves tearing up lengthy expanses of street or pavement. Boring machines are generally not practical, as the subsurface is already laced with numerous tunnels, conduits, subways, water lines, sewer lines, gas lines, and the like. Thus, a cost-effective method of routing additional cables of any type in urban environments is very desirable.

Use of existing infrastructure, for example water and sewer lines, particularly the latter, has been proposed. However, cable cannot merely be introduced into such environments and left to freely move. Continuous movement over long periods can generate fatigue and work-hardening in metal conductor containing cables. Sudden movements or the development of sharp bends or kinks can be destructive of fiber optic cables. Moreover, despite the numerous advances in cable insulation, covering, and armor, it is still not desirable, as a general rule, that the cable be continually immersed in liquid. For these reasons, it is desired to route, or "string" the cables in the topmost position of the pipeline where exposure to liquids is minimized to the extent possible, and, if possible, to enclose the cable in protective conduit.

In order to accomplish these aims, several methods have been proposed. In copending U.S. patent application Ser. No. 09/679,987 filed Oct. 5, 2000, it is proposed to employ an otherwise conventional pipeline relining procedure using a thermoplastic or thermosetting liner, this liner also having integral cable conduit(s) as supplied, and as illustrated in FIG. 2. By this procedure, it is possible to supply one or more cable conduits during the relining process. The conduits are fixed in position, and the conduit interiors are preferably isolated from the liner interior, to prevent or minimize contact of cable with pipeline fluids. This method is very cost-effective where pipeline renovation by relining is mandated. However, the method is not satisfactory for pipelines which are not totally in need of renovation.

It has been proposed to install "J-hooks" in the ceiling of sewer lines, the J-hooks carrying conduit or cable, as disclosed in FIG. 1. Installation of the J-hooks is problematic, however. Each hook requires drilling a hole into the existing pipeline, and securing the J-hook with an expandable lead "anchor" or by using a cementitious or adhesive grout. Due to the nature of sewer pipe material of construction and its constant exposure to wet or moist environments, many installation failures are to be expected, as is also occasional damage to the pipe itself, including perforation, cracking, etc. Installation is a slow process. Moreover, due to little support in directions transverse to the stem of the J-hook stem, the hooks may be removed by occasional passage of obstructions down the pipe, or by collision with sewer cleaning or renovating robots, etc.

It has been reported in the New York Times, Mar. 8, 2001, pp. G1 and G7, that Ka-Te System A. G. has developed a robotic system for installing bands resembling hose clamps, these bands having clamps mounted thereon to mount conduit. However, the robotic system for expanding the bands is complex and expensive, the bands provide little lateral support, and thus are subject to cocking out of position. Due in part to this lack of lateral support, bands must be installed close together in order to provide the necessary degree of support for the conduit.

It would be desirable to provide a method for routing cables which is cost-effective, which has little if any chance to damage the pipeline during installation, and which provides sufficient lateral support for the cable or conduit-receiving means that occasional passage of bulky materials or collision with pipeline cleaning equipment, etc., will not cause failure of the support means. It would be further desirable in preferred embodiments to provide a means of routing cables and/or conduit through existing pipelines which does not require pipeline relining, or the boring of numerous holes for discrete support hooks or other devices.

SUMMARY OF THE INVENTION

The present invention is directed to a method of routing cables and/or conduit through existing pipelines, preferably by means of a coiled or folded, expandable sleeve which is expanded and locked into place in an existing pipeline at regular intervals, or a section thereof, each sleeve or section thereof containing or adapted to receive at least one cable and/or conduit-receiving support means, and being configured so as to resist lateral "cocking" or "canting" forces.

BRIEF DESCRIPTION OF THE DRAWINGS

FIGS. 10–13 illustrate a few embodiments of cable support means;

FIG. 14 illustrates one embodiment of a snap-in support means;

FIG. 15 illustrates a snap-in support means installed on a carrier;

FIG. 16 illustrates one embodiment of a thermoplastic carrier/support means combination;

FIG. 17 illustrates one embodiment of a thermosettable carrier/support means combination;

FIG. 18 illustrates one embodiment of a coiled metal carrier/support means combination;

FIGS. 19a–d illustrates a further embodiment of a device of the present invention.

DETAILED DESCRIPTION OF THE PREFERRED EMBODIMENTS

Figure 1:
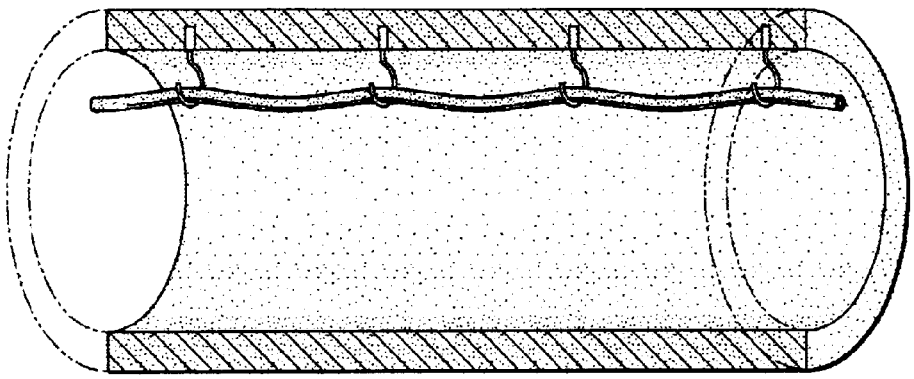
FIG. 1 illustrates a prior art process of routing cables and/or conduit in existing pipelines employing J-hooks.
Figure 2:
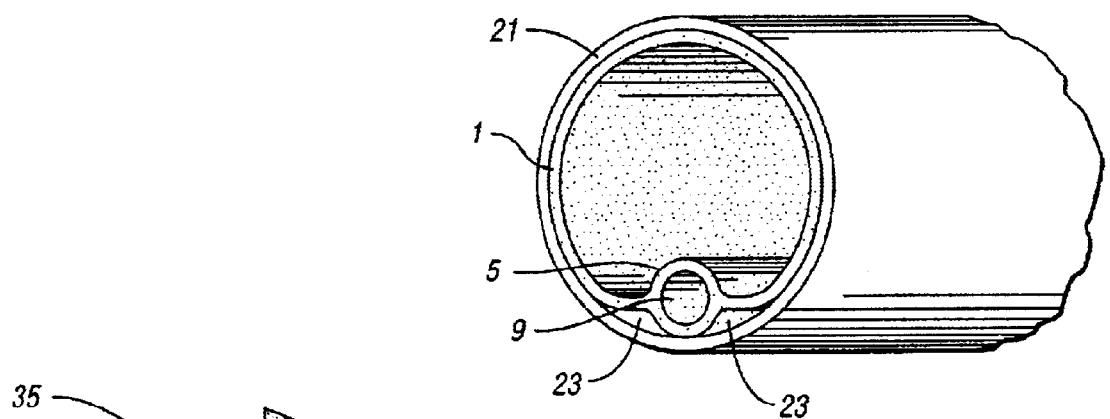
FIG. 2 illustrates a prior art process of routing cables and/or conduit in existing pipelines by a pipe relining process.

In the specification which follows, the term "cable structure" may be used to denote either a "cable" per se or a conduit for containing one or more "cables." Individual "cable" types may be denoted as "wire cables" or "optical cables" as necessity dictates. The types of wire cables and optical cables which may be routed employing the present invention are not limited. These may be electrical supply cables, i.e. for direct or alternating voltage for supply to households, businesses, machinery, etc., i.e. single, two, or multiple phase alternating current of any voltage, generally 110 v to 440 v; low voltage wiring, especially for control devices, for example 24 volt alternating or direct current.

Preferably, however, the "wire" cables are telecommunications cables such as those customarily used in the telecommunications industry. These may be of the coaxial type, single strands, sheathed cables containing a multiplicity of individual insulated strands or twisted pairs, etc. Coaxial cables may be those commonly employed in cable TV systems, i.e. those of 75 Ω impedance, or any other type. Multiple insulated wire cables may be those commonly employed in overhead and underground telephone wiring.

Optical cables include those containing but a single fiber optic element, as well as sheathed cables containing a plurality of fiber optic elements.

The above examples of electrical cables, signal cables, and optical cables are exemplary only, and not limiting. Any cable currently in use or yet to be developed may be routed using the subject devices and method.

As is the case with electrical and optical cables, the type of conduit of the "cable structure" is not limiting. These may be, for example, iron pipe threaded at the ends for interconnection, steel tubing of the type generally called "emt," plastic tubing, for example of polystyrene, polyvinyl chloride, polyethylene, polypropylene, polybutylene, or of other thermoplastic or thermoset polymers, flexible metal conduit, for example of the type known as "Greenfield," sheathed flexible metal conduit, and the like. Conduit may be specifically designed for such operations as well, and may be routed as single tubes, as a bundle of individual tubes, optionally linked or brazed together or coextruded, or as a sheathed set of multiple tubes. The conduit may be supplied as a continuous tube or as individual short lengths of tube.

The conduits may have, along the length thereof, or at their termini, "T" devices or elbows, etc., which allow signal cable from the interior of the conduit to branch off, for example to enter a building or cross-street. To ensure water tightness, where such is desired, the couplings, threaded ends, "T's," elbows, and the like may be sealed with grout, potting compounds, or the like, for example epoxy resins or RTV silicones.

The conduit may also have bends, either gentle bends brought about only by stress against the conduit support means as the pipeline traverses a gentle radius, or bends produced by bending the conduit prior to or after installation, for example by a tube bending device, etc.

The method of routing according to the subject invention involves installing conduit support means, as described hereafter, along a length of pipeline, and stringing cable by means of the supports provided thereby. The support means may be located at any desired interval in the pipeline. For very rigid conduit, for example, a support every twenty or so feet may suffice. However, in most cases, even with relatively rigid and self-supporting conduit, intervals of 10 feet or less are generally appropriate. The actual interval may be dictated by the system designer using known principles of civil and mechanical engineering. For stringing electrical, metal conductor, optical, and other signal cables, without conduit, more closely spaced intervals, e.g. every three to four feet may be desirable. The actual spacing is not critical to the invention. In preferred embodiments herein, the method of routing one or more support means are associated with each of a plurality of "carriers."

The carriers for the support means are generally of tubular section, whose outside diameter preferably provides, following installation, a tight fit against the pipeline interior wall. In a less preferred embodiment, the carriers may be of somewhat lesser diameter than the pipeline, and held into position by adhesive grout. However, it is anticipated that carriers of this nature will, in most cases, be more time consuming to install. Carriers which fix themselves into position upon uncoiling or expanding are preferred. Such carriers may be placed into position without any adhesive grout, which is the most desirable from a time and economy standpoint. Alternatively, such carriers may fix themselves into position and may then be adhesively bonded to the pipeline wall, either by an adhesive located on the outside of the carrier, or by an adhesive grout injected between the carrier and the pipeline wall following positioning of the carrier. In such cases, the increase in stability towards unwanted movement secured by the adhesive may outweigh any increase in cost or complexity, especially when heavy conduit is to be routed. However, because the carrier is fixed stably into position before adhesive is cured, or in some cases, before adhesive is applied, installation time is still minimal and economy is not overly affected.

Figure 10:
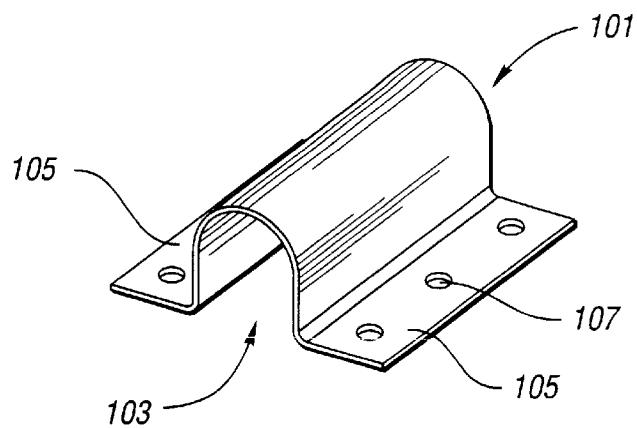

The carriers bear, or are adapted to receive, at least one cable support means, i.e. a physical device capable of supporting one or more cable structures. The cable support means may take numerous forms, so long as the support means is capable of supporting or encompassing the cable to the degree necessary for a secure installation. For example, the support means may comprise a ring, hook, tube, bolt, flange, etc. Other embodiments of support means will readily suggest themselves to those skilled in the art. Some of the more preferred support means may be described in relation to FIGS. 10–13. FIG. 10 illustrates one embodiment of a generally u-shaped support means 101 with a u-shaped channel 103 adapted to receive one or more cables, and one or two flanges 105 (two are shown), which may be spot welded, riveted, bolted or otherwise fastened to the carrier. Adhesive bonding to the carrier may also be used, as may also a variety of locking means, preferably spring loaded locking means. Support means such as those of FIG. 10 may be supplied, for example, with a curable pressure sensitive adhesive surmounted with a peelable release film. The adhesive may be cured by heat, by moisture, or by application of a curing agent or curing accelerator.

Figure 11A:
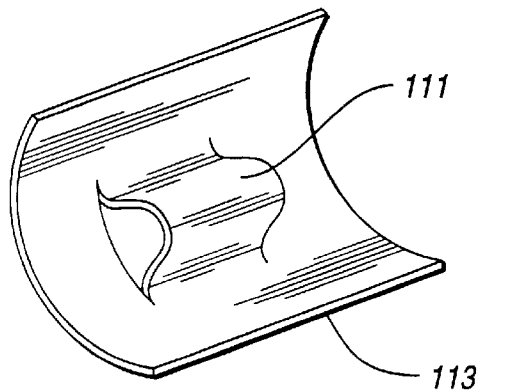
Figure 11B:
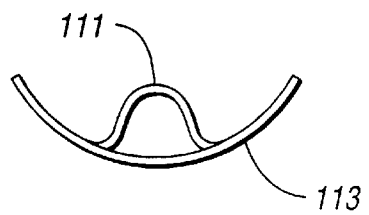

In FIGS. 11a and 11b are shown a generally u-shaped (circular, elliptical, square, rectangular, etc. cross-sections are also possible) support means 111 which is located in and is integral with the wall of carrier 113, and is formed therein by punching, or by cutting two or more parallel slits and bending the portion enclosed by the slits inwards.

Figure 12A:
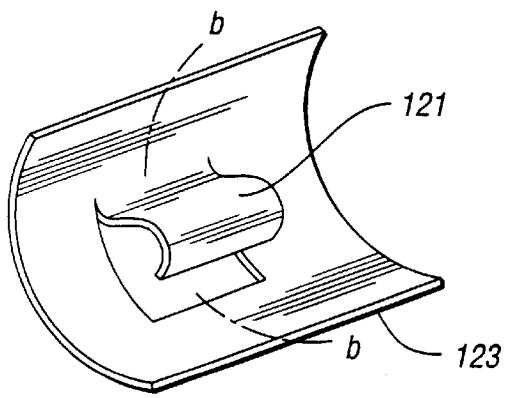
Figure 12B:
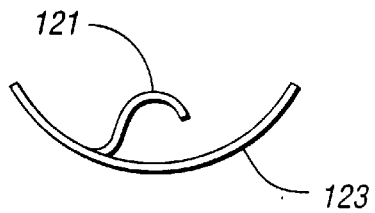

FIGS. 12a and 12b illustrate a further embodiment, similar to the support means of FIG. 11, wherein the portion of the carrier wall 121 punched out forms a hook 123 rather than a u-shaped structure. As can be seen from FIGS. 11 and 12, the actual shape of the support means is unimportant, so long as it serves its function of supporting the cable structure to be routed. It should be noted that a support means carrier such as those of FIGS. 11 and 12 may be manufactured with multiple support means rather than a single support means.

FIGS. 13 and 13a illustrate a very useful embodiment, where the carrier 131 has several projecting support means receiving flanges 133 stamped into the carrier 131. These flanges may be essentially triangular, as shown in the locking means of FIG. 4 of U.S. Pat. No. 5,351,720, or may take the form of bent tabs as in FIG. 13b herein. In FIG. 14, the support means 141 has projections, or as shown, flanges 143, and may be made of a resilient material, preferably stainless steel, more preferably a stainless steel having spring characteristics, or a fiber reinforced thermoplastic or thermoset polymer. As shown in FIG. 14b, the support means 141 may have projections 145 adapted to mate particularly with the receiving flanges. In the case of receiving flanges such as those of 133 in FIG. 13, such projections may assist in preventing lateral movement of the support means. In FIG. 14c, the support means 141 is of rectangular section with associated flanges, while the support means of FIG. 14d has no flanges, but only projections 145. Other variations, as well as means of preventing lateral movement, e.g. stop flanges in the wall of the carrier readily suggest themselves to one skilled in the art.

The support means of the types illustrated by (but not limited by) FIG. 14 are compressed slightly, for example by applying pressure on the flanges, and snapped into position into the receiving flanges shown in FIGS. 13, 13a and 13b or in equivalent receiving structures. The result is an installed support means as shown in FIGS. 15 and 15a, with the flange 143 of the support means 141 being locked into receiving flanges 133 in the wall of carrier 131.

The "snap-installed" or "locking" support means described in FIGS. 13–15 have several notable advantages. First, they may be installed in the field, if desired. Second, the shape and size of the cable-receiving portion of the support means may be varied to suit different sizes and numbers of cables. Third, the carrier may be manufactured with numerous receiving flanges so that a plurality of support means may be installed, either at the same or at different times. Thus, the method of the subject invention anticipates the necessity of further cable routing as communication, etc. demands increase in the future. Fourth, a series of staggered receiving flanges may be provided in order to supply a straight path for cable when installation of the carrier is inadvertently displaced radially in the pipeline. Fifth, the snap-installation support means may be easily un-installed, should that be necessary, or replaced with differently shaped support means.

In addition to the support means described above, the support means may be bolted to the carrier, may be bonded by pressure sensitive adhesives, epoxy resins, silicone adhesives, polyurethane adhesives, and the like. Any means of fastening, mounting, or forming the support means onto or into the carrier may be used. These methods of mounting, forming, etc., and equivalents thereof are well known to those skilled in the arts of forming materials and fastening materials.

The carrier of the present invention may take numerous forms. Essentially, the carrier is a tubular, or "cylindrical" structure or portion thereof which can be inserted and transported into the pipeline and fixed into place, preferably without boring holes into the pipeline or, in general, without piercing the wall of the pipeline by any means. Thus drilling or purposeful piercing operations are generally unnecessary in preferred embodiments. However, it would not depart from the spirit of the invention to install a carrier by one or more of the methods disclosed herein, following which a spike, nail, bolt, anchor, etc. may be installed in the pipeline wall as a redundant securing means. Moreover, in one less preferred aspect of the invention, a "holed" fastener may be used to secure, preferably temporarily, a carrier which is adhesively bonded or grouted to a pipeline wall until the adhesive bond is cured to the extent necessary to join the carrier to the pipeline wall. In such cases, the weakening of the pipeline wall which is disadvantageous with prior art "J-hooks" is overcome, as the installed fastener is surrounded by adhesive or grout, and the pipeline wall in the vicinity of the fastener is reinforced by the presence of the carrier.

Several embodiments of carriers will be discussed hereafter; others will readily suggest themselves to those skilled in the art. In a first embodiment, the carrier is an expandable thermoplastic or thermoset tubular sleeve. In these embodiments, the sleeve is inserted into the pipeline in a folded configuration such as those shown in FIGS. 16 and 17. In FIG. 16, the carrier is a thermoplastic sleeve 1601 which carries a preformed support means 1603 preferably of the same type of thermoplastic. Such carriers and support means may be manufactured by conventional extrusion techniques and sliced into suitable lengths. Such products are, before slicing into short lengths, substantially the same as the integral liner/conduit assemblies of copending U.S. patent application Ser. No. 09/679,987, and may be made in a non-limiting sense, of similar materials, e.g. polyolefins, polyvinylchloride, and the like. The tubular sleeve length may be any length sufficient to provide resistance to "cocking" in the pipeline.

For example, but not by way of limitation, the length may be from about one third the pipeline diameter to about three times the pipeline diameter, more preferably about one half the pipeline diameter to about one and one half times the diameter for pipelines less than about 12 inches diameter. For larger pipelines, the carriers may have a somewhat narrower aspect than those used in smaller pipelines. For example, for pipelines having diameters of 1 to 2 feet, the minimum length should range from about 4 inches for 1 foot diameter pipelines to about 6 inches for 2 foot diameter pipelines; for pipelines between 2 and 4 feet in diameter, the minimum carrier length should range from about 6 inches for a two foot diameter pipeline, about 8.5 inches for a three foot diameter pipeline, and about 10 inches for a four foot diameter pipeline. These minimum lengths are all preferred minimum lengths, suggested for use in the absence of grout and in the absence of loading means as hereafter described, in order to form a carrier resistant to cocking in the pipeline.

The preferred maximum lengths also vary with the pipeline diameter, but again not directly. Carriers for smaller pipelines in general, are preferably longer in relation to the pipeline diameter than in larger pipelines, partially because longer lengths in small diameters are economically feasible. Thus, the preferred maximum length in a 1 foot diameter pipeline ranges from 0.75 feet to 1.5 feet, while in a 3 foot pipeline, it may range from 1.5 feet to 3 feet. Longer lengths will be essentially wasteful of material. Moreover, routing cable will be increasingly more difficult the longer the sleeve. This defect can be eliminated in part by removing portions of the support means so that it is shorter than the sleeve proper. In no case will the sleeve be so long as to constitute a relining operation as that operation is understood by one skilled in the art of pipeline relining, i.e. the installation of such sleeves is "discontinuous".

In FIG. 16, the sleeve is shown folded into a "C" section. Other types of folding are useful also, as shown in U.S. patent application Ser. No. 09/679,987. In FIG. 16, the support means is shown surrounding an optional "collar" or bushing 1605 which may comprise a metal tube, thermoset polymer tube, high melting point thermoplastic tube, ceramic tube, etc. The function of this bushing is primarily to avoid collapse of the thermoplastic support means 1603 when the carrier is heated and expanded into the pipeline. The bushing may be equipped with smoothed or outwardly flared ends to facilitate entry of cable through the bushing. The bushing may, if not made of a lubricious material, be coated with a lubricious substance or may contain an inner sleeve of lubricious polymer, i.e. PTFE, polyethylene, or polypropylene, or a natural or synthetic wax, grease, or the like. More than one support means may be molded into the same sleeve. In addition, the sleeve may be modified to accept snap-in support means. A plain circular folded expandable sleeve not bearing any support means when manufactured, but manufactured to contain fastening devices, receiving flanges for snap-in support means, or adhesively bonded, fusion bonded, solvent bonded, etc. support means, may be used as a carrier.

In practice, the expandable thermoplastic carrier is inserted into the pipeline, and heated, before, during or both before and during installation, to a deformable state. Pressure, for example an inflatable tubular bladder, is applied from within the folded sleeve, unfolding it and pressing it against the interior wall of the pipeline. The expandable or inflatable bladder may be equipped with heating means, such as an internal bladder or path for hot water, steam, etc., or may be equipped with an electrical heating device. Adhesive may be located on the outside of the carrier, applied to the pipeline wall, or injected between the carrier and the wall to insure positional stability. Adhesive is particularly useful with carriers whose length is appreciably less than the pipeline diameter, for example one half to one third the pipeline diameter. Thus, sleeves with lengths of one to two inches in 10 inch to 12 inch pipelines may require an adhesive to keep them stably positioned during cable routing and subsequent use of the pipeline.

In another embodiment, the carriers may be curable resin-impregnated woven or non-woven sleeves, also generally in a folded configuration, for example a short section of the integral conduit/reliner of copending Application U.S. Ser. No. 09/679,987, as illustrated in FIG. 17. Such short lengths may contain one or a plurality of support means. In the case of curable resin-impregnated carriers, it is very preferable that the support means be rigid or carry a rigid collar or bushing, as described as an option for thermoplastic folded, expandable carriers.

In thermoplastic carriers/support means, the generally high wall thickness of the thermoplastic carrier combined with the small relative size of the cable support means will often allow insertion and expansion of the carrier without substantially deforming the support means. The cable receiving hole in the support means is generally supplied in a larger diameter than the diameter of cable to accommodate some deformation. An elliptical or elongated circular cross-section with the major axis directed radially toward the center of the pipeline may also be quite advantageous. Upon expansion, this elongated cross-section support means will be expected to distort somewhat, toward a more circular cross-section.

However, in the case of resin-impregnated fibrous carriers, the carrier and any support means portion made of the same material has substantially no rigidity until cure. Thus, if there is no rigid collar or bushing, alternative means will have to be used to maintain the shape of the cable-receiving hole of the support means until after cure. For example, a removable plug may be used for this purpose, or pressure may be applied to the interior of the cable-receiving hole. However, the latter is technically difficult. Thus, solid or inflatable plugs (i.e. balloons) should be used in the cable-receiving holes during expansion and cure if rigid collars or bushings are not used.

The resin of the resin-impregnated sleeves may be moisture curable, anaerobic curing (when applicable), thermosetting (i.e. epoxy, bismaleimide, RTV silicone, etc.), or photocurable, i.e. photocurable unsaturated polyester. All such resins are well known in the art. Photocurable resins are preferred. Examples of suitable resins may be found in U.S. Pat. Nos. 2,944,994, 4,581,247, 4,439,469, and 4,135,958.

A resin-impregnated fibrous sleeve is depicted by FIG. 17, where the carrier 1701 bears support means 1703 which, in this case, is itself a resin-impregnated fibrous structure, i.e. resin-impregnated woven or non-woven fiberglass, synthetic fiber, needled felt, etc., as is the major portion of the carrier 1705. The support means includes a rigid collar or bushing 1707.

In a preferred embodiment, the carriers take the form of an expandable, coiled structure. In this embodiment, the carrier is a coiled, cylindrical structure whose outermost diameter, because of the coiling, is sufficiently less than the inside diameter of the pipeline to allow it to be inserted and positioned prior to expansion by uncoiling and locking into a fixed position. The carrier may or may not carry cable support means prior to introduction into the pipeline; support means or additional support means may be added following insertion. By the term "cylindrical" is meant the shape following installation. The structure, prior to coiling, may be viewed as a cylinder split to have a seam defining two lateral edges. The split need not be parallel to the pipeline direction, but may be at an angle, i.e. a spiral slit, so long as the ends may pass by each other to form a coiled configuration. In a preferred embodiment, simple expansion of the coil by a pneumatic or hydraulic bladder serves to allow the carrier to lock in its expanded condition.

In coiled or folded versions of the carriers disclosed herein, by the "exterior" or "external surface" and like terms is meant that surface of the device which will be located adjacent or proximate the interior wall of the pipeline in which the carrier is to be installed, while the "interior" or "internal surface" or like terms means the surface remote from the pipeline interior wall, which will form a new interior surface in the pipeline through which the fluid carried by the pipeline may flow. In similar fashion, the "interior" or "internal surface" of a cable structure support means will be the surface closest to the cable or conduit to be installed in the cable support means. By "lateral edge" or like terms with respect to coiled carriers is meant the edges of the coiled structure which will change their position during expansion of the coiled cylindrical sleeve into a locked cylinder. In sleeves where the lateral edge is orthogonal to the imaginary face of a (closed) cylinder, i.e. parallel to the length of the cylinder, these lateral edges will also be parallel to the direction of the pipeline. By "ends" with respect to the sleeve is meant the ends perpendicular to the axis of the cylinder and at the extremes thereof.

Figure 3A:
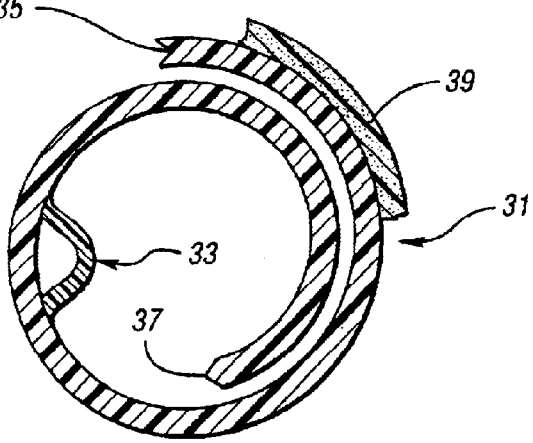
FIG. 3 illustrates one embodiment of the present invention, employing a coiled sleeve of plastic material carrying a conduit support means on its interior surface.
Figure 3B:
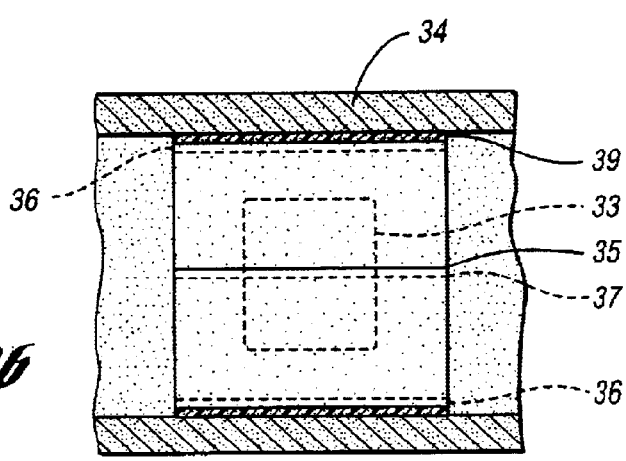

One embodiment of a coiled carrier is shown in FIGS. 3a and 3b. In FIG. 3a, the coiled carrier 31 (in cross-section) is of plastics material, and carries support means 33. At end 35 of the carrier, the lateral edge is manufactured with a notch, while the opposite lateral edge 37 is manufactured with a corresponding apex or tongue to mate with the notch. The exterior of the carrier may optionally be coated with or laminated to a foraminous or solid elastomeric material 39. The carrier is shown from the side, installed in a pipeline 34 in FIG. 3b, where the walls 36 of the coiled carrier are surrounded by elastomer or adhesive 39. Suitable edge-type locking means are shown in U.S. Pat. No. 5,725,026, herein incorporated by reference. Alternative edge-locking means are illustrated, for example, in U.S. Pat Nos. 5,351,720; 5,971,030; 5,119,862; and 6,138,718; the disclosures of which are incorporated herein by reference. The exterior may also be coated with adhesive. In preferred cases, the adhesive is a curable gel or soft elastomer which can then take place of the foraminous or elastomeric coating 39.

In use, the coiled structure is inserted into the pipeline, positioned longitudinally and radially (to line up support means, etc.) and expanded by an elastomeric bladder or other device, i.e. a rubbery bladder expanded by air, water, or other fluid pressure. Suitable expansion means are known to the art; several are disclosed in the patents previously mentioned, for example. The expansion must initially be enough to force the locking edges of the coiled structure past themselves, so that they may lock when the pressure is released.

Due to the relatively small tolerances which would otherwise be required, it is preferred that the assembly include an elastomeric or foraminous covering, a very viscous, thixotropic mastic-like adhesive or an elastomer or gel 39. The use of these allows the actual carrier 31 to be made somewhat smaller than the pipe upon full expansion, the interstice between the pipeline interior and the carrier exterior being occupied, at least in part, by a yielding and possibly somewhat displaceable elastomer, gel, etc. By this means, expansion such that the longitudinally-oriented lateral locking edges pass each other and lock upon removal of internal pressure (i.e. bladder pressure) is more easily achieved.

The foraminous or elastomeric coating may be any conventionally known, including those disclosed in U.S. Pat. Nos. 5,351,720; 5,971,030; and 6,138,718. For example, polypropylene foams, polyurethane foams, microcellular polyurethane elastomers, non-cellular polyurethane elastomers, natural rubber or synthetic rubber, i.e. buna-N, neoprene, chloroprene, etc., may be used. Heavily loaded (filled) curable adhesives of any type may be used. Such adhesives are well known and readily available commercially. Likewise, numerous RTV silicone elastomeric adhesives may be used, as well as epoxy adhesives. It is desirable that such adhesives be one-component adhesives, i.e. RTV-1 type adhesives. Moisture curing adhesives are most preferred, such as moisture curing RTV-1 silicone adhesives.

Figure 4A:
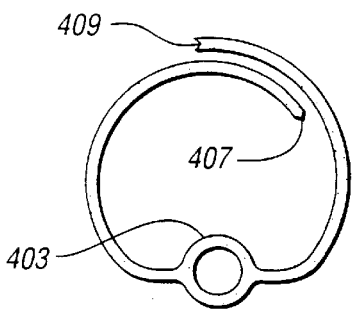
FIG. 4 illustrates another embodiment of the present invention, wherein the conduit support is on the exterior of an expandable sleeve.
Figure 4B:
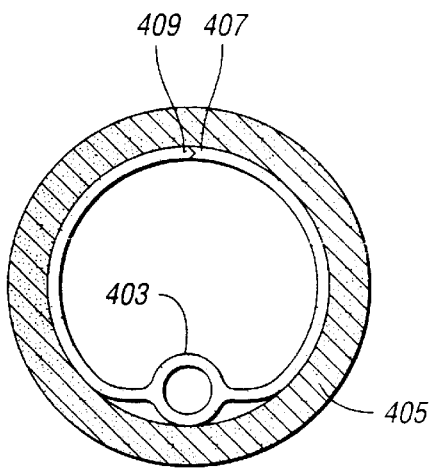
Figure 5:
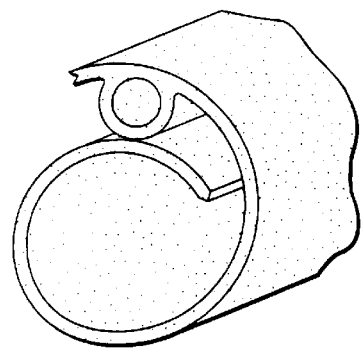
FIG. 5 illustrates an embodiment of the subject invention where the conduit support forms part of the locking system of a coiled, expandable sleeve.

In FIG. 4, a carrier is shown which is similar to that of FIG. 3, but the support means is located on the exterior of the coiled carrier. Upon installation, the installed carrier 401 and support means 403 is shown inside pipeline 405. The locking ends 407 and 409 are locked. Note that there is a bulge as a result of this type of installation, although the tolerances required are less.

A further form of coiled, expandable carriers, which are presently preferred over the coiled plastics carriers just described, comprise coiled metal carriers with a locking feature. The locking feature may be any mechanical contrivance which functions to lock the carrier in an expanded condition. Many types of locking devices are thus possible. Several examples of locking devices are illustrated in FIG. 13. Preferred locking devices are "autolocking" passive devices which lock upon expansion of the coiled structure, without the need for special mechanical devices to manipulate closures such as those found on hose clamps and the like.

Figure 6:
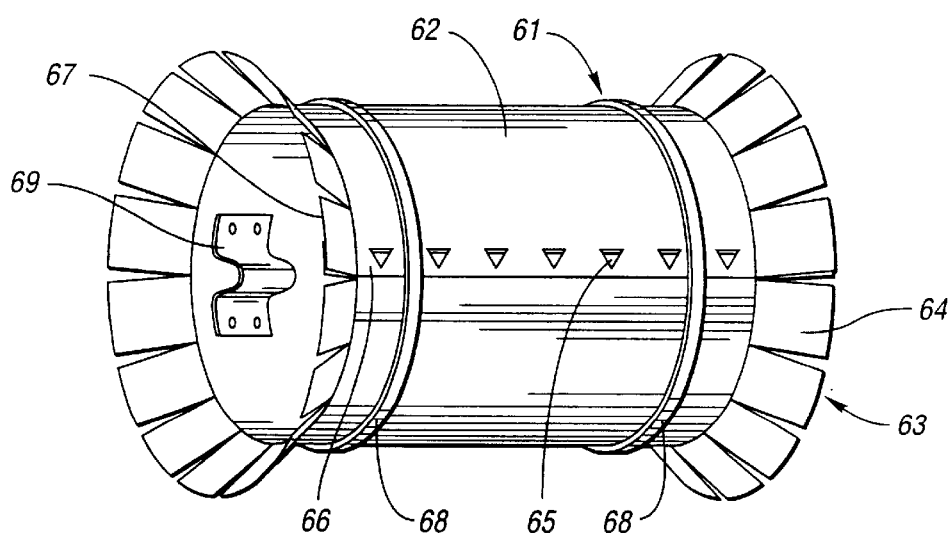
FIG. 6 illustrates a coiled metal sleeve having integral conduit support.

A further suitable carrier is similar to the repair sleeve disclosed in U.S. Pat. No. 5,351,720, and illustrated by FIG. 6 herein. In FIG. 6, the carrier 61 of the invention is shown in its uncoiled expanded and locked position. For the sake of simplicity of illustration, only the carrier is shown in FIG. 6, no grout or elastomeric covering being located on the outer surface 62 of the sleeve 61. At each end portion of the carrier 61 is an outwardly projecting flare 63, including an outer flare surface 64 which generally provides an extension of the outer surface 62 of the carrier. Although the angle of the flares or flare portions 63 relative to the outer surface 62 of the carrier is shown to be approximately 45°, other angles can be utilized and still enable the sleeve to meet the objectives further described below. Notches 65 have received corresponding locking projections to lock the carrier to lock the edges 66 and 67 together. Bands 68 may, if elastomeric, assist in maintaining a coiled configuration prior to expansion and locking. They may also serve to limit the spreading of injected grout between the carrier and the pipe, when grout injection is desired. A conduit support means is shown at 69. Multiple support means may be installed.

Figure 6A:
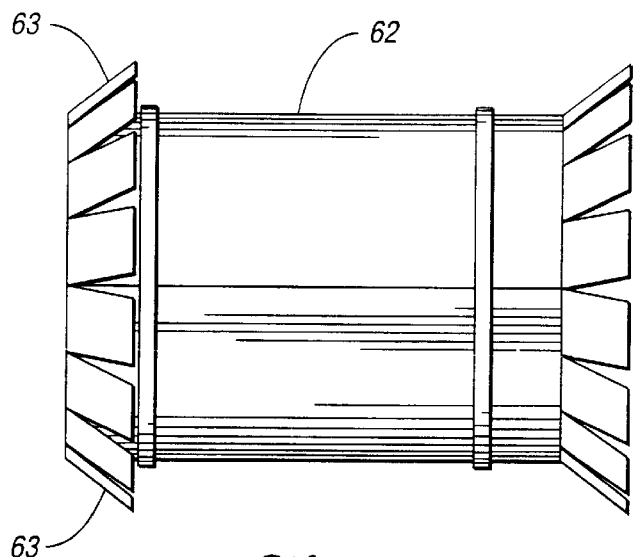

A significantly improved version of the device of FIG. 6 has the tabs on one of the two flared end portions 63 bent at an acute angle such that rather than extend away from the generally tubular sleeve 62, they are bent back over the sleeve as shown in FIG. 6a. Such devices are more readily inserted into a pipeline as both sets of tabs are oriented in the same direction.

Figure 9:
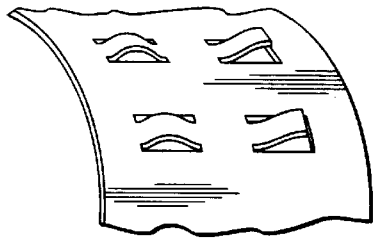
FIG. 9 illustrates spring-type "fingers" of two types which promote maintenance of position in a pipeline.
Figure 9A:
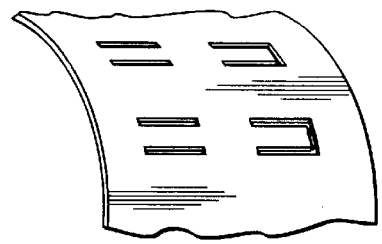
Figure 9B:
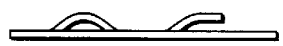

It is preferred, particularly with metal carriers of limited aspect ratio, but also with polymer-based carriers of thermoplastic or of previously cured thermosetting, fiber reinforced polymer, that the exterior of the carrier be loaded radially inwards by a carrier "loading means" which functions to exert a force between the pipeline interior wall and the exterior of the carrier. The loading means may be a series of radially outwardly directed flanges as shown in FIG. 6, may be spring-like fingers as shown in FIG. 9, or may take other forms, preferably as a result of bending, cutting, or punching operations on the metal carrier, or in the case of previously cured thermoset carriers, during the curing operation.

Alternatively, the loading means may comprise an elastomeric, deformable cover or band covering the exterior of the carrier or a portion thereof when installed. The outer diameter of the locked-in-place carrier is selected, relative to the pipeline inside diameter, along with the thickness of the elastomer, to place the latter under compression, thus exerting a force or "load" between the pipeline wall and the carrier.

Loading means such as those described, or others which function to radially load at least a portion of the carrier in a direction inward from the pipeline interior wall are most important, and preferably required, in the absence of grout, for aspect ratios less than 0.2. However, these carrier loading means are also desirable with larger aspect ratios less than 0.33, and even when the aspect ratio is quite large, i.e. 1.2 to 1.5 or greater. In addition to performing the function of radially loading the carrier to aid in preventing its displacement from the desired installed position, the carrier loading means enables easy installation which can be accomplished with very simple robotic devices, i.e. those having a simple expandable bladder for expansion and locking of the carrier in the pipeline.

For example, a carrier may be prepared as shown generally in FIG. 6, with a single set of locking projections, but with several sets of locking notches, in rows parallel to the lateral edge of the device. Upon expansion against the loading means, the locking projections will first pass the set of locking notches which would result in a minimum diameter carrier. As the carrier is more fully expanded against the pressure of the loading means, a second set of locking notches will have been passed. Upon release of the pressure of expansion, the loading means will attempt to force the coil into a smaller diameter, whereupon the locking projections will enter and mate with the last set of locking notches passed, thus locking the carrier into position. The force exerted by the expanding means, i.e. a bladder, can be adjusted to take account of variations of actual diameter, i.e. caused by pipeline manufacturing tolerances, wear, or the presence of deposits. The force may also be mitigated for older pipelines which may not be as robust as newer pipelines. Of course, the loading means described above may also be used with grout or adhesive.

A further embodiment of the subject invention is shown in FIG. 18. In FIG. 18, the carrier 1801 is a tubular sleeve having a lip 1803 along one edge and an edge receiving flange 1805 attached to the opposite edge 1807 of the carrier. At one portion of the periphery of the carrier, a cable support means, in the form of a generally semicircular or U-shaped trough 1809 is punched into the carrier. The carrier may be extruded with the trough already formed, or the trough may be added subsequently, particularly in the case of metal carriers. The trough 1809 may extend all along the length of the carrier, i.e. to the opposite end 1811, or may extend only along a portion of the length. In FIG. 18, two troughs 1809 and 1813 are illustrated, with a portion of the carrier 1815 being continuous, i.e. not having a trough. Alternatively, the trough may be located in the middle of the device, where portion 1815 is now located, with the end portions of the carrier being continuous between the longitudinal edges of the device. More than one support means may be provided, i.e. a plurality of troughs or series of troughs may be formed radially around the carrier. A cross-section of a carrier with two support means is shown in FIG. 18b.

The device of FIG. 18 has several notable advantages. First, the device is easily and economically manufactured. Second, particularly when U-shaped troughs are employed, the U-shape adds an additional area of flexion as shown in FIG. 18b in an enlarged view where the U-shape has been distorted somewhat as the coiled carrier is expanded. The ability of the support means to distort in this fashion may assist in enabling the locking edges to slide by each other as the device is uncoiled to enable the locking mechanism to engage, and yet following locking of the edges, when the U-shaped support means return to their undistorted shape, allow the outside diameter of the now-locked carrier to correspond closely with the inside diameter of the pipeline into which the carrier is inserted. Deep U-shaped troughs facilitate such spring-like movement, whereas more semicircular troughs are not as spring-like. As with other embodiments, the device of FIG. 18 may have an elastomer, elastomer foam, adhesive, grout, etc. mounted on the outside surface, preferably with the exception in the vicinity of the trough, or may have adhesive grout, etc. applied between the outside wall of the device and the inside wall of the pipeline.

The length/diameter ("aspect ratio") of coiled metal carriers installed without the addition of adhesive or grout located between the carrier and the pipeline wall should be such that the carrier does not "cock" or "cant" out of position in the pipeline when exposed to lateral forces. For this condition, the carrier should preferably have a minimum aspect ratio of at least 0.25 for pipelines up to 2 feet in diameter, more preferably at least 0.33, yet more preferably at least 0.5, and most preferably at least 0.75. For pipelines greater than 3 feet in diameter, the minimum aspect ratio is preferably greater than 0.2, more preferably greater than 0.25, yet more preferably greater than 0.33, and most preferably greater than 0.5.

In metal carriers such as the above, the greater the aspect ratio, the more resistant will be the carrier to being cocked or displaced in the pipeline. Thus, aspect ratios of 0.75 to 1.5 are preferred for carriers for smaller pipelines, whereas aspect ratios of 0.6 to 1.0–1.2 are preferred for larger pipelines. Aspect ratios may go as high as 2.0 or higher, but aspect ratios higher than 2.0 are not preferred.

In the case of carriers having elastomeric material on the exterior, the aspect ratio may be lowered, as compression of the elastomer will generate a force which will tend to resist locking in the pipeline. In such cases, smaller diameter carriers may have aspect ratios as low as 0.2 or lower, while larger diameter carriers may have aspect ratios as low as 0.15. These aspect ratios are suitable for grouted carriers as well.

Figure 19A:
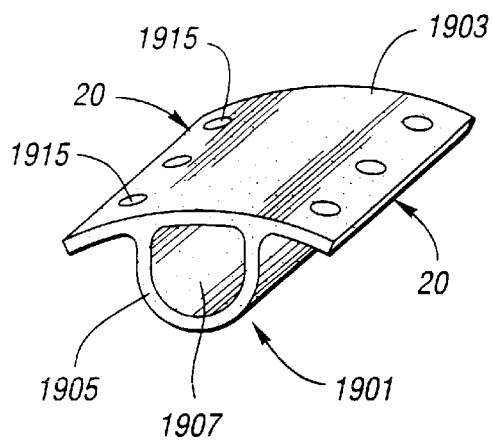
Figure 19B:
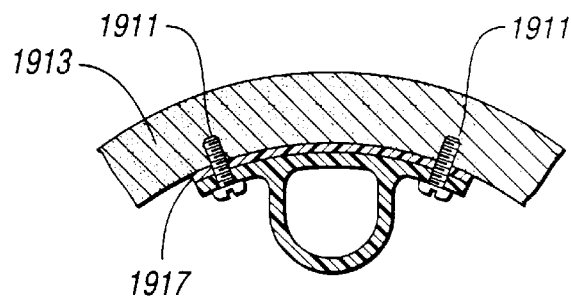
Figure 19C:
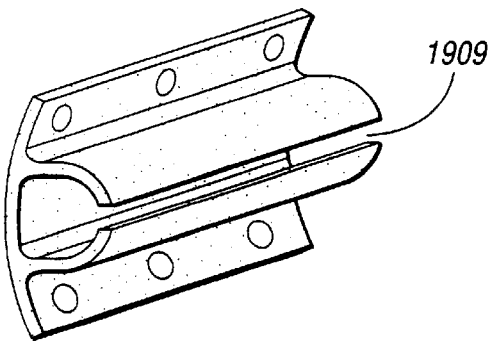
Figure 19B:
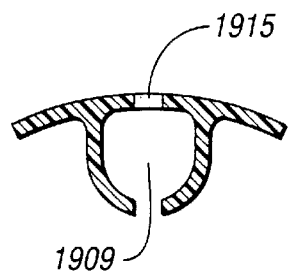

In another embodiment, the carrier is in the form of a section of a hollow cylinder whose outside radius of curvature corresponds substantially to the internal pipeline radius. Such a device is shown in FIG. 19, and may be made of metal or plastic. Referring to FIGS. 19a and 19b, the device 1901 comprises carrier 1903 whose outside radius of curvature R in some embodiments, is substantially the same or preferably somewhat less than the radius of curvature R' of the inside of pipeline 1913. The carrier 1903 carries cable support means 1905 containing a hole 1907 or channel 1909 (FIG. 19c) to receive the cable. The carrier 1903 may be directly mounted to the inside of pipeline 1913 by means of one or more fasteners (screws, nails, bolts, spikes, etc.) 1911 which are inserted through holes 1915 optionally provided. This method of attachment is less preferred.

Figure 20:
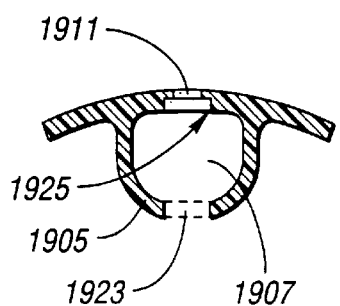
FIG. 20 illustrates a cross-section of a device of the type illustrated by FIGS. 19a–d.

A more preferred mode of attachment is shown in FIG. 19b. In this mode, the outside radius R is preferably, but not mandatorily made slightly less than the interior pipeline radius R' so that a layer of mastic or adhesive 1917, i.e. an epoxy or urethane gout, etc., may somewhat uniformly fill the space defined between R and R'. In one embodiment of this mode of attachment, the fastening devices 1911 are still used. However, these devices fulfill only a portion of the necessary adherence to the pipeline, the remainder formed by the curing of the adhesive. In a more preferred embodiment of this mode of attachment, only a few, or preferably only one fastener 1911 is used. Such a fastener is advantageously located at the center of curvature of the device, as shown in the channel support means device of FIGS. 19c and 19d. In such cases, it may be desirable that R be slightly greater than R' such that the distortion of the device upon tightening the fastener will apply pressure between a substantial part or all of the outside surface of the carrier and the pipeline wall. In the case of carriers having enclosed support means 1907 as shown in FIG. 19a, a portion of the central portion of the support means, i.e. at a location halfway down the length of the device, may be machined away to form a fastener access hole 1923 (or the part may be molded with the hole already in place) so that access to the fastener hole 1921 may be provided. A cross-section across 20—20 is shown in FIG. 20. This device has an optional shoulder 1925 machined or molded in to received the head of the fastener, so that it does not protrude into the cable support means cavity 1907.

A further preferred means of attachment is adhesive bonding of the carrier to the pipeline wall by means of adhesive without the use of any fastener. In such cases, either a fast setting adhesive is preferred, or the carriers are preferably installed from the most distant locations first, leaving an expanded balloon or bladder in the pipe temporarily until adhesive is set. In all these adhesive applications, whether fasteners are also used or not, it is preferable to first clean the pipeline wall by standard means to encourage firm bonding. This is true of other embodiments herein where adhesives are used as well, although in completely circular embodiments, i.e. such as those illustrated by FIGS. 3 to 6, this is less important, as the adhesive does not form a large part of the attachment of the device and need accept much lower loadings.

A principle advantage of the embodiment of FIG. 19 where fasteners only are used, as compared to devices such as J-hooks, is that the relatively large surface area helps to distribute loads which, if applied to a single unsupported fastener, would result in bending or breaking of the fastener or the portion of the pipeline wall in which it is anchored.

In the embodiments of FIG. 19 which employ both fasteners and adhesives, yet further advantages accrue. The adhesive takes much of the load which would otherwise be borne by the fasteners, particularly transverse loads generally parallel to the length of the pipeline. Moreover, the presence of the carrier and adhesive surrounding the general vicinity of the fasteners helps prevent deterioration of the pipeline wall at these points. For example, the adhesive will assist in both preventing propagation of cracks formed by fastener insertion or subsequent loading, and may assist in filling these cracks as well.

The above embodiments may all be modified to correspond to unique problems associated with any particular installation. Moreover, the various individual features of the embodiments described are not useful merely with those figures illustrating those embodiments alone, but are generally useful with other embodiments in various combinations, as well. As but one example, the snap-in support means of FIGS. 13 and 14 can be used with a suitably designed fastener or adhesively bonded carrier of FIG. 19.

Thus, in one broad aspect, the present invention pertains to a carrier of generally hollow cylindrical cross-section or a segment thereof which is of a physical size smaller than a pipeline into which it is to be inserted, and which can be attached to the interior wall of a pipeline in a substantially discontinuous manner, the carriers bearing or adapted to receive at least one cable support means, such that a cable can be routed through an existing pipeline, the cable carried within or mounted to the support means. By such means, and by the method provided herein, conventional robotic methods may be used to route cables of all types through existing pipeline infrastructure in a rapid and cost-effective manner.

By the terms "a" and "an" are meant "one or more" or "at least one" when used in the claims, unless the context clearly indicates otherwise. The term "cable structure" is inclusive of both cables and conduit, as discussed earlier. By the term "discontinuously installing" is meant that carriers are installed generally spaced apart in the pipeline, i.e. a continuous carrier is not contemplated hereby. An installation where two or more carriers are in an abutting relationship is still within the scope of the claims so long as a plurality of total carriers have a spaced apart relationship.

By the term "fixing" in a pipeline is meant positioning in such a manner as to be able to maintain a stable position under normal operating conditions. Some movement is certainly tolerable. When adhesively bonded carriers are used, little movement is expected. By the term "installing cable support means" is meant the installation of a first or subsequent support means in a previously installed carrier, the carrier having been manufactured to receive one or more support means.

By the term "uncoiling and expansion" is meant that a coiled, generally cylindrical carrier such as that of FIG. 4 (but not limited thereto) is uncoiled and pressed against the pipeline wall sufficiently so as to lock together proximate the edges upon release of the expanding forces. By the term "formed integral therewith" as it applies to support means, is meant that the support means has been manufactured with the carrier or has been bonded or welded to the carrier so as to be essentially inseparable therefrom.

The terms "grout," "adhesive," "mastic" and like terms, when describing an adhering substance located between the carrier and the pipeline wall, include cementitious as well as organic adhesives, and are generally used interchangeably. Thus, in the claims, "adhesive" includes "grout."

Figure 7:
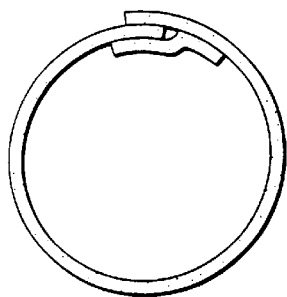
FIG. 7 illustrates another embodiment of a locking means which can be employed with a variety of sleeves.
Figure 8:
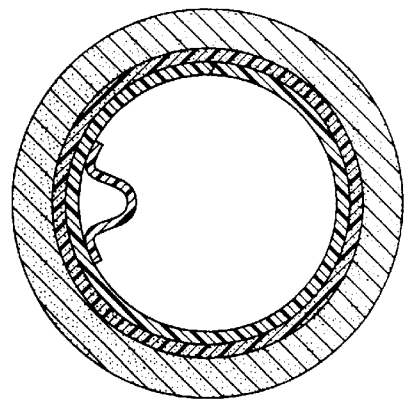
FIG. 8 illustrates a compressible foam or rubbery elastomer exterior covering which promotes maintenance of position in a pipeline.

By the term "autolocking means" is meant a passive locking device which serves to lock a coiled carrier in an expanded and generally cylindrical shape, i.e. toward or against the interior wall of a pipeline, the autolocking means functioning upon retraction of the coiled surfaces past each other from a more fully expanded mode. Non-limiting examples of autolocking means are shown in FIGS. 3, 6 and 7. An autolocking means does not include a configuration wherein a screw must be turned, a band shifted or applied, etc.

What is claimed is:

1. A method of providing a means of routing a cable structure in an existing pipeline having an internal radius R', said method comprising:

discontinuously installing a plurality of carriers into an existing pipeline, said carriers optionally associated with a loading means which functions to exert pressure radially inward onto the exterior of the carrier between the carrier or a portion thereof and the interior wall of said pipeline, and fixing said carriers in said pipeline, wherein said carriers bear a cable support means adapted to receive a cable structure or are adapted to bear a cable support means;

and where when said carriers bear no cable support means but are adapted to bear a cable support means, installing cable support means in a plurality of said carriers, said cable support means adapted to receive a cable structure, wherein said carrier comprises a hollow cylindrical sleeve or portion thereof, said cylindrical sleeve having a coiled or folded configuration whose largest dimension, prior to fixing in said pipeline and in a plane orthogonal and transverse to the direction of the length of the cylinder, is less than the diameter of the pipeline, said cylindrical sleeve being expandable by unfolding, uncoiling, or a combination thereof, to an external diameter R substantially the same as R', and when said carrier is of coiled metal having no loading means located between the external metal surface of the carrier and the interior of the pipeline wall, said metal carrier has an aspect ratio of at least 0.33.

2. The method of claim 1, further comprising:

routing a cable structure through said pipeline, said cable structure supported at intervals along the length thereof by said support means.

3. The method of claim 1, wherein said carrier comprises a coiled structure having a length in the direction of the cylindrical axis and two interlocking edges such that upon uncoiling and expansion of said coiled structure said edges interlock to form a cylinder having an outside diameter sufficient by itself or with the use of an elastomeric covering and/or adhesive located between the exterior of the cylinder and the pipeline wall, to fix the carrier in said pipeline.

4. The method of claim 3, wherein said coiled structure has, on its outermost exterior surface, an elastomeric material, an adhesive, or a combination thereof.

5. The method of claim 3, wherein said coiled structure has a cable support means formed integral therewith.

6. The method of claim 5, wherein said cable support means comprises a ring, trough or channel adapted in size to receive a cable structure.

7. The method of claim 3, wherein said coiled structure includes cable support means receiving means.

8. The method of claim 7, wherein a cable support means is mounted onto said carrier by means of said cable support means receiving means.

9. The method of claim 8, wherein said cable support means receiving means comprises a pair of flanges or notches in the wall of said carrier, and said cable support means comprises a generally U-shaped or circular cable structure receiving portion and two flanged portions, said flanged portions capable of being compressed and inserted between said pair of flanges or dimples of said carrier, locking said cable support means into position upon decompression of said flanged portions.

10. A method of installing a cable structure in an existing pipeline having an internal radius R' by the method of claim 1, said method comprising:

discontinuously installing a plurality of carriers into an existing pipeline, said carriers optionally associated with a loading means which functions to exert pressure radially inward onto the exterior of the carrier between the carrier or a portion thereof and the interior wall of said pipeline, and fixing said carriers in said pipeline, wherein said carriers bear a cable support means adapted to receive a cable structure or are adapted to bear a cable support means;

and where when said carriers bear no cable support means but are adapted to bear a cable support means, installing cable support means in a plurality of said carriers, said cable support means adapted to receive a cable structure, wherein said carrier comprises a hollow cylindrical sleeve or portion thereof, said cylindrical sleeve having a coiled or folded configuration whose largest dimension, prior to fixing in said pipeline and in a plane orthogonal and transverse to the direction of the length of the cylinder, is less than the diameter of the pipeline, said cylindrical sleeve being expandable by unfolding, uncoiling, or a combination thereof, to an external diameter R substantially the same as R', and when said carrier is of coiled metal having no loading means located between the external metal surface of the carrier and the interior of the pipeline wall, said metal carrier has an aspect ratio of at least 0.33; and routing a cable structure through said pipeline, said cable structure supported at intervals along the length thereof by said support means.

\* \* \* \* \*